United States Patent [19]

Hazelden et al.

[11] Patent Number: 4,995,480
[45] Date of Patent: Feb. 26, 1991

[54] VEHICLE BRAKE

[75] Inventors: Roger J. Hazelden, Redditch; Ian J. Sheppard, Kenilworth; Philip A. Taft, Cheswick Green, all of Great Britain

[73] Assignee: Lucas Industries public limited company, Birmingham, England

[21] Appl. No.: 491,098

[22] Filed: Mar. 9, 1990

[30] Foreign Application Priority Data

Mar. 17, 1989 [GB] United Kingdom ............... 8906137

[51] Int. Cl.$^5$ ............................................. F16D 66/00
[52] U.S. Cl. .................................. 188/1.11; 340/453; 188/181 T; 303/112
[58] Field of Search ............... 188/1.11, 181 T, 71.1, 188/138, 79.51; 303/112; 340/453, 454; 250/227.15; 116/208; 73/121, 862.23, 862.08, 862.32, 862.33, 7, 129

[56] References Cited

U.S. PATENT DOCUMENTS

| | | | |
|---|---|---|---|
| 3,711,162 | 1/1973 | Steinbrenner et al. | 188/181 T X |
| 3,722,629 | 3/1973 | Totschnig | 188/1.11 |
| 3,740,566 | 6/1973 | Newstead | 188/1.11 X |
| 3,902,157 | 8/1975 | Kita et al. | 188/1.11 X |
| 3,943,486 | 3/1976 | Hayashida et al. | 188/1.11 X |
| 4,004,269 | 1/1977 | Arai et al. | 188/1.11 X |
| 4,020,454 | 4/1977 | Malonee | 188/1.11 X |
| 4,128,146 | 12/1978 | Hubbard | 188/138 |
| 4,184,145 | 1/1980 | Fima | 188/1.11 |
| 4,217,973 | 8/1980 | Johns et al. | 188/1.11 X |
| 4,606,434 | 8/1986 | Vasilow et al. | 188/1.11 |

Primary Examiner—Douglas C. Butler
Attorney, Agent, or Firm—Staas & Halsey

[57] ABSTRACT

A vehicle brake has a fixed backplate carrying a pair of friction elements and an actuator operable to urge the elements into braking engagement with a rotary braking surface. An abutment for the elements has a portion which is deflectable by load on the elements arising from braking torque. A radiation input device directs radiation at a surface of the deflectable portion and a device is provided to sense radiation after its impingement on the portion and to transmit the sensed radiation to a device producing a responsive electrical output representing deflections of the portion.

11 Claims, 3 Drawing Sheets

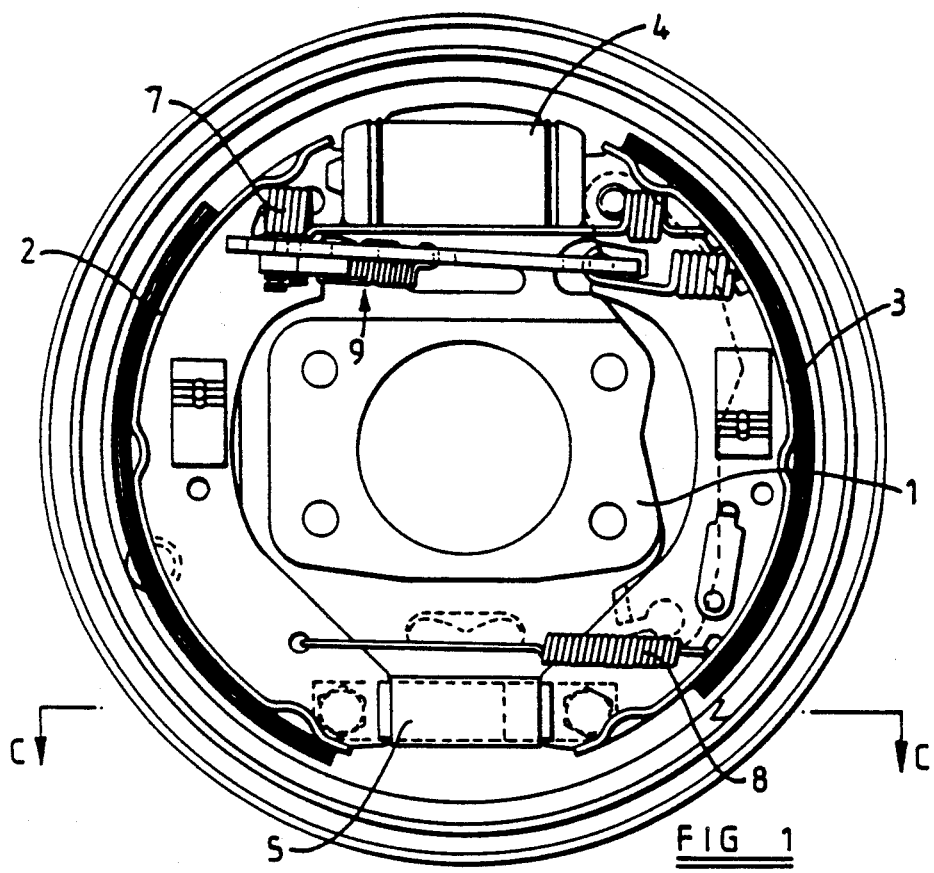
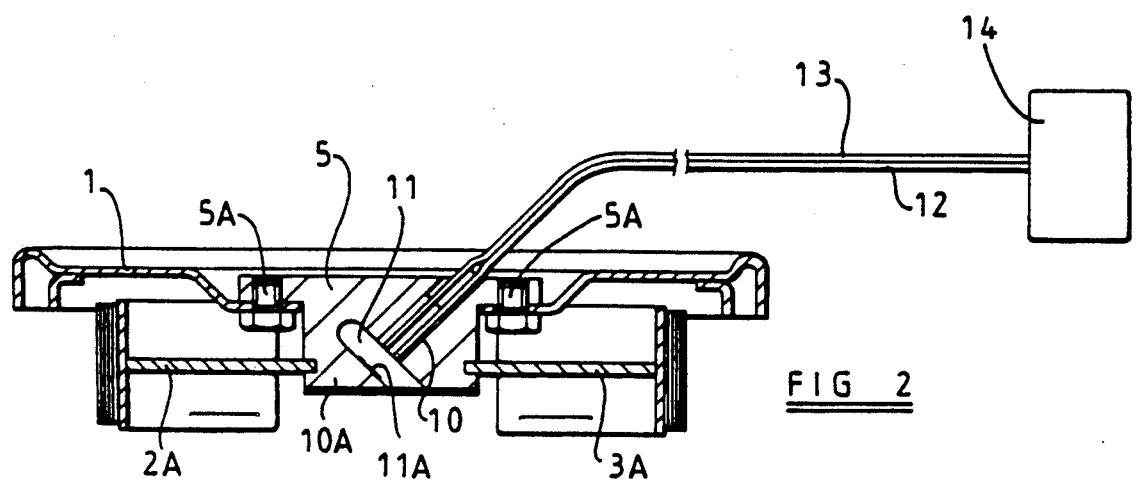
FIG 1
FIG 2

VEHICLE BRAKE

This invention relates to a vehicle brake of the general kind in which at least one friction element is urged by an actuator into braking engagement with a rotatable braking surface.

With the advent of electronically controlled braking, it is desirable to be able to measure the torque arising during braking and to produce a signal representative thereof for use as one of the control parameters to be fed to an electronic control unit which exerts control over operation of the brake. Force measurement can be effected by means of strain gauges and potentiometers, but such devices do not generally provide a sufficiently high output and/or are not sufficiently sensitive for sensing brake torque from small movements of brake components. They are, moreover, subject to vibrational disturbance and a potentiometer, in particular, is sensitive to temperature variations, neither of which qualities is desirable for the type of measuring device referred to.

An object of the present invention is to provide a vehicle brake in which brake torque is measured in a convenient and accurate manner.

According to the invention, a vehicle brake of the aforesaid general kind comprises a relatively fixed torque-bearing member carrying at least one friction element, an actuator operable to urge said element into braking engagement with a rotatable braking surface, deflectable means arranged in the force transmission path between said element and the torque-bearing member so as to be subject to torque arising on said element during braking and deflectable by load arising from said torque, radiation input means arranged to direct radiation at a surface on said deflectable means and means arranged to sense radiation which has impinged on said surface and to transmit the sensed radiation to means producing a responsive electrical output representing deflections of said portion.

In one convenient arrangement, said radiation is directed across a gap partially defined by said surface on the deflectable portion and variations in the position of said surface as a result of deflection of said portion produce corresponding variations in sensed radiation. Said surface may conveniently be reflective so as to return impinging radiation across the gap to said sensing means.

When the brake is an internal shoe drum brake, the deflectable portion is preferably part of a fixed abutment member disposed between and engaged by one pair of adjacent ends of the brake shoes. Conveniently, with such an arrangement, the gap is inclined to the plane containing the brake shoe webs, typically at approximately 45° to said plane.

The invention will now be described, by way of example, with reference to the accompanying drawings in which:

FIG. 1 is an end view of an internal shoe drum brake embodying the invention;

FIG. 2 is a section along the line C—C of FIG. 1;

Figure 3:
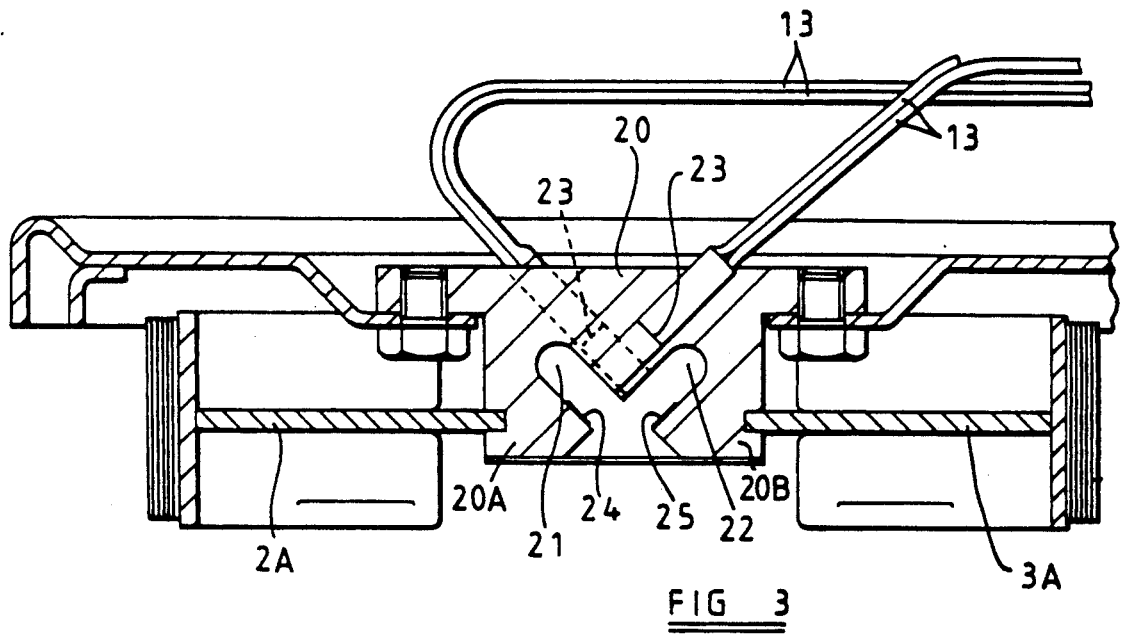
FIG. 3 is an enlarged view similar to FIG. 2 illustrating an alternative arrangement.

The brake of the invention illustrated in FIG. 1 is an internal shoe drum brake which includes a back plate 1 carrying a pair of brake shoes 2, 3, an hydraulic actuator 4 fixed to the backplate between one pair of adjacent shoe ends and an abutment member 5 fixed to the backplate between the other pair of adjacent shoe ends. Operation of the actuator 4 separates the shoes into engagement with a rotatable drum (not shown) and brake torque then arising on the shoes is reacted by the abutment 5 in a manner depending upon the direction of rotation of the drum. Shoe return springs 7, 8 act to urge the shoes towards their retracted positions and an adjuster assembly, indicated generally at 9, is provided to maintain a substantially constant shoe to drum clearance of the retracted shoes, in conventional manner.

The abutment 5 is illustrated in greater detail in FIG. 2 and will be seen to be secured to the backplate by bolts 5A and to be engaged by the ends of respective webs 2A, 3A of the brake shoes 2, 3. A radiation transmitter/sensor assembly 10 is mounted in an opening in the abutment 5 and connected by a pair of optical fibre cables 13 to an electronic unit 14. This typically incorporates a light-emitting diode which emits optical radiation in the visible spectrum for transmission by the assembly 10, and a photo electric cell which produces an electrical signal in response to light input received by the assembly 10. The abutment is provided with a gap 11 extending obliquely to and intersecting the plane containing the shoe webs 2A, 3A and the assembly 10 is disposed at one side of the gap. The gap lies across the line of force transmission from the shoe ends to the abutment and the portion 10A of the abutment remote from the assembly 10 is arranged to be deflectable under the effect of forces sustained by the abutment and arising from braking torque upon engagement of the shoes with the drum 6. A surface 11A of the deflectable abutment portion 10A at the side of the gap opposite to the assembly 10 is such as to reflect the radiation emitted by the transmitter part of the assembly, this part being disposed in the abutment so as transmit the radiation perpendicularly towards surface 11A. Radiation reflected by the surface 11A across the gap 11 is sensed by the sensor part of the assembly 10 and fed along the appropriate one of the cables 13 to the electronic unit 14 to actuate the photo-electric cell therein which produces a responsive electrical signal.

When the brake is actuated, slight deflection of the abutment portion 10A will occur when it sustains torque forces arising on the shoes as a result of their engagement with the rotating drum. Such flexing, typically of the order of 50 microns for the leading shoe, will have the effect of varying the width of the gap 11 in proportion to the load sustained by the abutment, such that the distance travelled by the light reflected across the gap by the surface 11A will vary. Deflections of the part 10A appear at the sensor part of the assembly 10 as a variation in light intensity, as a result either of the amount of light collected at the sensor varying, or of variations in the size of the gap 11 across which the light is returned, or as a result of both of these effects. Such variations are sensed by the sensing part of the assembly 10 and converted in the electronic unit 14 to electrical signals representative of braking torque which may be used as a control parameter for operation of the brake.

FIG. 3 shows an alternative form of abutment 20 which is provided with a pair of deflectable portions 20A, 20B and corresponding slots 21, 22 inclined in opposite directions to the plane of the shoe webs 2A, 3A. Associated with each slot is a respective transmitter/sensor assembly 23, one of which is illustrated in its position relative to its associated slot 21 and the other of which would extend at right angles to the first and be similarly associated with the slot 22. Each slot has a respective reflective surface 24, 25 at its side remote from its associated transmitter/sensor assembly 23 for reflecting transmitted light back across the gap to the associated sensor and hence via cables in the form of optical fibre bundles 13 to a control unit (not shown), as before. This embodiment is able to produce a signal representative of the shoe tip load experienced by the abutment 20, and therefor of braking torque, for both directions of drum rotation.

Figure 4:
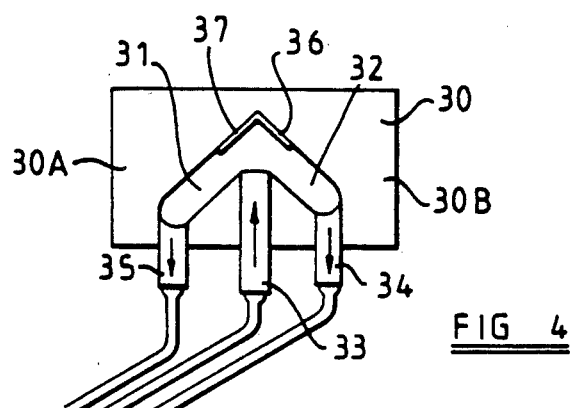
FIGS. 4 and 5 are respectively diagrammatic representations of two alternative forms of part of the brake of the invention.

FIG. 4 is a diagrammatic representation of an alternative abutment 30 in which are provided a pair of slots 31, 32 disposed mutually at right angles and using a single transmitter 33 disposed centrally between the slots and a pair of sensors 34, 35 arranged respectively opposite to reflective surface portions 36, 37 of the slots spaced across the slots from the transmitter 33. As before, actuation of a brake containing the abutment 30 will cause deflection of one of a pair of deflectable portions 30A, 30B of the abutment 30, and corresponding distortion of one of the slots, depending upon the direction of the load applied to the abutment. The resulting movement of one of the reflective surfaces 36, 37 relative to the associated sensor 34, 35, gives rise to an output representative of the movement and therefore of the applied load.

Figure 5:
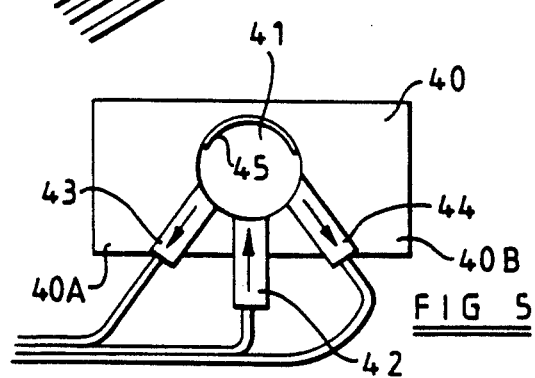

The alternative arrangement illustrated in FIG. 5 has an abutment 40 in which a circular opening 41 is formed. An optical transmitter 42 is arranged to transmit radiation diametrically across the opening 41 and a pair of sensors 43, 44 are arranged respectively at either side of the transmitter 42 and receive reflected radiation from an opposed reflective surface portion 45 of the opening. When braking occurs, load applied to the abutment 40 will tend to deflect one or the other of two deflectable portions 40A, 40B of the abutment and thereby distort the opening 41 into an elliptical form. This produces a variation in the reflected radiation which is detected by the appropriate sensor 43, 44, the latter giving rise, in the electronic unit, to a signal representative of the distortion and therefore of the applied load, as before.

Figure 6:
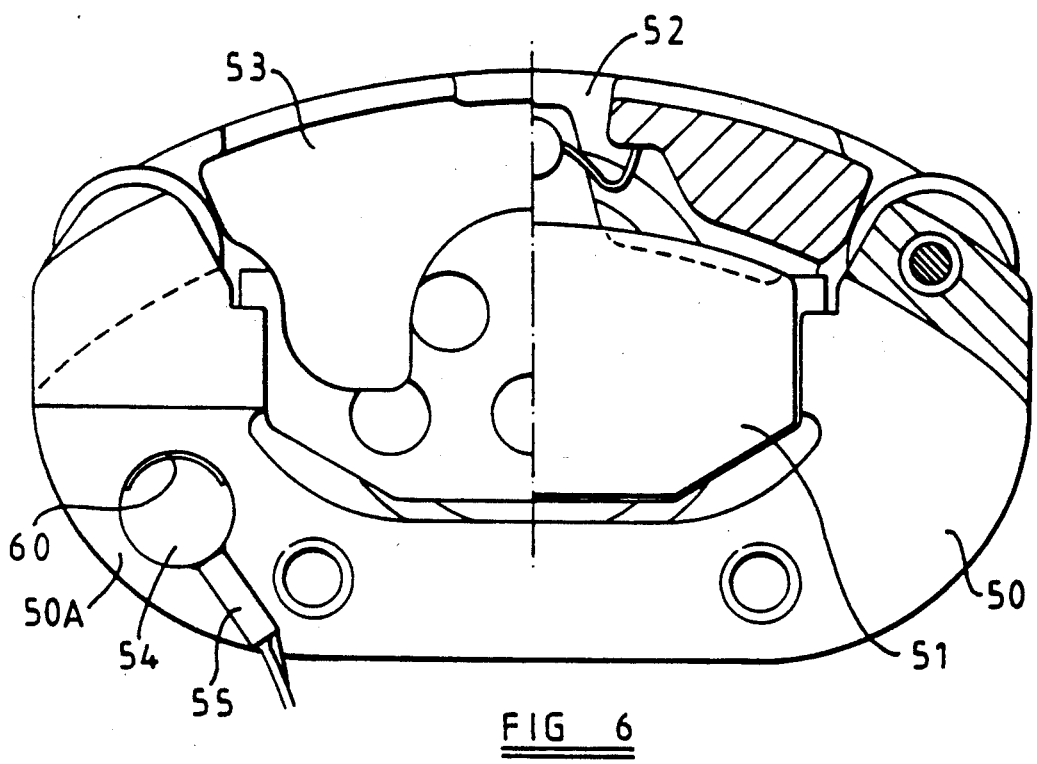
FIG. 6 is an end view of a disc brake embodying the invention.
Figure 7A:
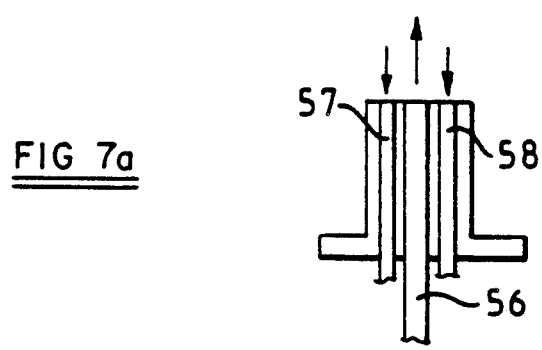
FIGS. 7a and 7b are a detail illustrating part of FIG. 6 in greater detail.
Figure 7B:
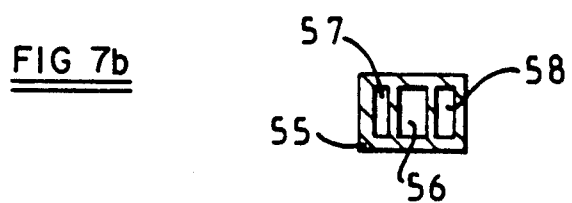

An alternative brake of the invention is illustrated in FIG. 6 and is in the form of a sliding caliper disc brake having a fixed carrier 50 which supports a directly actuated friction pad assembly 51 and a slidable caliper portion 52 which carries an indirectly actuated friction pad assembly 53. In this arrangement, a circular opening 54 is formed in the carrier 50 and a transmitter/sensor assembly 55 is mounted in the carrier with its operative end adjacent the opening 54. As can be seen more clearly from FIG. 7, the assembly 55 has a first bundle of optical fibres 56 conveying optical energy to the opening and this is flanked by two further bundles 57, 58 which act to receive light reflected from the opposite reflective wall portion 60 of the opening, the assembly 55 being diametrically opposite said wall portion. When the friction pad assemblies 51, 53 are applied against a rotatable brake disc (not shown) torque arises thereon and is transmitted to the carrier 50 to cause deflection of a deflectable portion 50A and corresponding distortion of the opening 54 which tends to become slightly elliptical. This has the effect of altering the balance of reflected radiation received by the sensors 57, 58 and a signal is thereby produced which is proportional to the degree of distortion experienced by the slot and therefore to the applied load arising from the braking torque on the friction pad assemblies. The use of a circular opening gives rise to less stress concentration than the other described arrangements and can be advantageous, for example in heavy duty brakes.

It will be understood that any convenient form of slot other than those illustrated may be employed and those illustrated may be interchanged as between the described embodiments, or any other embodiments of the invention, as desired. The radiation employed is preferably visible optical radiation, but this may alternatively be within the infra-red or ultra-violet part of the spectrum. The radiation may, alternatively, be any other suitable electro-magnetic radiation and the transmitter/sensor assembly chosen accordingly. The reflective surfaces within the slots may be replaced or supplemented by other arrangements such as an absorptive surface, or may be constituted by reflective and/or absorptive bands arranged in any desired pattern. It may also be alternatively possible to employ a diffraction grating in place of or in addition to a reflective or absorptive surface. Instead of providing the deflectable portion on an abutment of the brake, as in the embodiment described above, it would be possible to incorporate this in a part of the friction element assembly, such as in a shoe tip in the embodiments of FIGS. 1 and 2 and FIG. 3.

The type of sensing described herein, and particularly optical sensing, requires very little deflection of the sensed component in order to produce a satisfactory control signal. It is, therefore, especially suitable for use in vehicle brakes since these are generally required to be as stiff and solid as possible and component deflection therein is necessarily limited. The use of a shoe tip abutment to incorporate the sensing arrangement is particularly advantageous since the surface of the abutment engaged by the shoes can be parallel, allowing the shoes to perform their necessary sliding movements thereon. The electronic unit, which is susceptible to damage by excessive heat and vibration, may readily be placed in a remote protected location on the vehicle and connected to the brake during installation of the latter. The abutment, cables and electronic unit can be assembled together prior to installation and the abutment and its associated components may then be assembled through the back of the brake, thereby avoiding the use of optical connectors in the cables. The invention is applicable not only to the hydraulically actuated brakes described herein, but also to brakes having various kinds of mechanical actuators such as cams, screws and levers. The brake of the invention is especially suitable for actuation by an electric motor driven actuator under the control of the electronic control unit.

In the embodiments described, each sensor detects directly the light crossing the associated gap and the sensed radiation is fed to the control unit to produce a corresponding electrical signal. When a pair of sensors is employed, as in the embodiments of FIGS. 3 to 6, it is possible to use the ratio of the response at the sensors in order to produce the control signal. A ratio greater or less than one would indicate respectively the greater load occuring at one side or the other of the abutment. Such a method helps to eliminate variations caused by possible fluctuations in the intensity of the radiation source.

It will be understood that the deflectable portion may be formed in further alternative ways to those described herein and the various forms of deflectable portion may be embodied in any type of brake in ways other than those described herein.

We claim:

1. A vehicle brake comprising a relatively fixed torque-bearing member carrying at least one friction element and an actuator operable to urge said element into braking engagement with a rotatable braking surface, deflectable means arranged in the force transmission path between said element and the torque-bearing member so as to be subject to torque arising on said element during braking and deflectable by load arising from said torque, radiation input means arranged to direct radiation at a surface on said deflectable means and means arranged to sense radiation which has impinged on said surface and to transmit the sensed radiation to means producing a responsive electrical output representing deflections of said portion.

2. A brake according to claim 1, wherein said radiation is directed across a gap partially defined by said surface on the deflectable means and variations in the position of said surface as a result of deflection of said deflectable means produce corresponding variations in sensed radiation.

3. A brake according to claim 1 wherein said surface is reflective so as to return impinging radiation from said input means to said sensing means.

4. A brake according to claim 1 in the form of an internal shoe drum brake, wherein the deflectable portion is part of a fixed abutment disposed between and engaged by one pair of adjacent ends of the brake shoes.

5. A brake according to claim 4, wherein said radiation is directed across a gap formed in the abutment and partially defined by said surface on the deflectable portion said gap being inclined to the plane containing the brake shoe webs.

6. A brake according to claim 4, wherein said abutment is provided with a pair of deflectable portions and corresponding gaps inclined in opposite directions to the plane of the shoe webs each gap cooperating with a respective transmitter and sensor arranged transversely with respect thereto.

7. A brake according to claim 1 wherein a single transmitter is arranged to direct radiation towards a surface spanning a plurality of deflectable regions of said abutment, and respective separate sensors are arranged to sense radiation which has impinged on parts of said surface associated with different ones of said deflectable regions.

8. A brake according to claim 1, wherein a single transmitter is arranged to direct radiation at a pair of mutually angled surfaces associated respectively with a pair of deflectable portions of said abutment, and sensors are arranged to receive radiation respectively from said surfaces.

9. A brake according to claim 7, wherein said surface spanning said deflectable regions is arcuate and is deformed as a result of deflection of said regions.

10. A brake according to claim 1 in the form of a sliding caliper disc brake, wherein said deflectable portion partially defines an opening through a fixed carrier and said surface is part of the internal wall of said opening, the radiation input means being arranged generally diametrically opposite to said surface so as to transmit radiation across the opening on to said surface which deforms as a result of deflection of said portion such as to modify the radiation received by a sensor after impingement on said surface.

11. A brake according to claim 10 wherein sensors form part of a transmitter sensor assembly, said sensors being disposed at either side of the transmitter and receiving varying amounts of radiation from said surface according to the degree of deflection of said portion.

* * * * *